US010609530B1

(12) United States Patent
Patil et al.

(10) Patent No.: US 10,609,530 B1
(45) Date of Patent: Mar. 31, 2020

(54) ROLLING OUT UPDATED NETWORK FUNCTIONS AND SERVICES TO A SUBSET OF NETWORK USERS (71) Applicant: Verizon Patent and Licensing Inc., Arlington, VA (US)

(72) Inventors: Sudhakar Reddy Patil, Flower Mound, TX (US); Lalit R. Kotecha, San Ramon, CA (US); Violeta Cakulev, Millburn, NJ (US); Hossein M. Ahmadi, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/366,708

(22) Filed: Mar. 27, 2019

(51) Int. Cl.
*H04W 4/50* (2018.01)
*H04L 29/08* (2006.01)
*H04W 24/04* (2009.01)
*G06F 8/65* (2018.01)
*H04W 84/04* (2009.01)

(52) U.S. Cl.
CPC ............ *H04W 4/50* (2018.02); *G06F 8/65* (2013.01); *H04L 67/16* (2013.01); *H04L 67/34* (2013.01); *H04W 24/04* (2013.01); *H04W 84/042* (2013.01)

(58) Field of Classification Search
CPC .. G06Q 10/06; G06Q 10/0631; G06F 16/951; G06F 16/9535; G06F 16/248; G06F 16/24575; G06F 16/2455; G06F 16/2272; G06F 16/245; G06F 8/65; G06N 5/003; H04L 67/306; H04L 63/102; H04L 67/1002; H04L 67/2842; H04L 67/34; H04L 63/20; H04L 67/16; H04W 24/08; H04W 4/08; H04W 4/50; H04W 24/04; H04W 84/042
See application file for complete search history.

(56) References Cited

U.S. PATENT DOCUMENTS

| 2005/0240608 | A1* | 10/2005 | Jones | H04L 67/306 |
| 2006/0136701 | A1* | 6/2006 | Dickinson | G06F 8/61 |
| | | | | 712/205 |
| 2018/0365131 | A1* | 12/2018 | Armitage | G06F 11/3676 |
| 2019/0174449 | A1* | 6/2019 | Shan | H04W 60/04 |

* cited by examiner

*Primary Examiner* — Daniel Lai

(57) ABSTRACT

A system includes an updated network function and a consumer network function. The updated network function includes a recent update and is configured to register at a Network Repository Function (NRF) using a Network Function (profile (NF profile). The NF profile indicates a network function type (NF type) and a first priority associated with the update. The consumer network function is configured to: receive a message from a network component; determine to engage a service of a network function of the NF type based on the message; determine a desired priority for the service; and send a discovery request to the NRF in response to the message; receive a search result from the NRF in response to the discovery request. The search result has a list of candidate network functions of the NF type.

20 Claims, 10 Drawing Sheets

| NF Profile 624 |
| --- |
| NF Type 636 |
| FQDN 638 |
| PLMN ID 640 |
| S-NSSAIS 642 |
| NSI List 644 |
| NF Status 646 |
| PRIORITY 648 |
| CAPACITY 650 |
| LOAD 652 |
| NF Services 654 |

FIG. 6D

| NF Service 654 |
| --- |
| Service Name 660 |
| Versions 662 |
| Service Status 664 |
| FQDN 666 |
| PRIORITY 668 |
| CAPACITY 670 |
| LOAD 672 |

ROLLING OUT UPDATED NETWORK FUNCTIONS AND SERVICES TO A SUBSET OF NETWORK USERS

BACKGROUND INFORMATION

In order to satisfy the needs and demands of users of mobile communication devices, providers of wireless communication services continue to improve available services. One aspect of such improvements includes the ability to develop, test, and deploy core network functions without adversely impacting the large numbers of mobile devices currently being serviced by the networks.

DETAILED DESCRIPTION OF PREFERRED EMBODIMENTS

The following detailed description refers to the accompanying drawings. The same reference numbers in different drawings may identify the same or similar elements.

A 5th Generation (5G) wireless network architecture may include different network services. Typically, in a 5G network, the services are grouped or wrapped into network functions. Each network function node, or simply "network function," registers its services with a Network Repository Function (NRF). When a particular network function needs services of other network functions, the particular network function queries the NRF to discover the other network functions or services.

One problem in implementing network functions is that, due to ever shortening development times and lifecycle of network components, the network administrators, operators, and developers may need to practice continuous integration and continuous delivery. Continuous integration is a coding tactic, philosophy, or set of practices for implementing small code changes and checking in the code to version-control repositories on a frequent basis. Continuous delivery refers to automation of the delivery of modified code instances to selected environments (e.g., a network). One approach to providing continuous integration and delivery practice involves the use of Canary releases, which refer to releases associated with a technique to reduce the risk of introducing a new software version in a production environment, by slowly rolling out the change to a subset of users before rolling it out to the entire infrastructure and making it available to all users.

Applying a Canary release includes deploying the new version of software to a subset of the infrastructure or users. As soon as the new version is ready, the software may service a few selected users. As the system upgrades the software to more stable versions, the upgraded versions may be progressively installed in other portions of the infrastructure and may service an increased number of users at selected times.

Depending on the implementation, the system may use different ways to select the users that are to be serviced by a particular version of the software, such as random selection, a demographics-based selection; or a relationship-base selection (e.g., a premium service-paying customers, non-paying customers, etc.). In one implementation, the system may select users based on a desired service priority.

By slowly increasing the use of software, it is possible to monitor different parameters for measuring the stability of software and its impact on infrastructure subsets that are deploying the software. Furthermore, by limiting user exposure to the software, it is sometimes possible to eliminate or loosen the requirements for testing the software in a setting that fully emulates the production environment.

Figure 1:
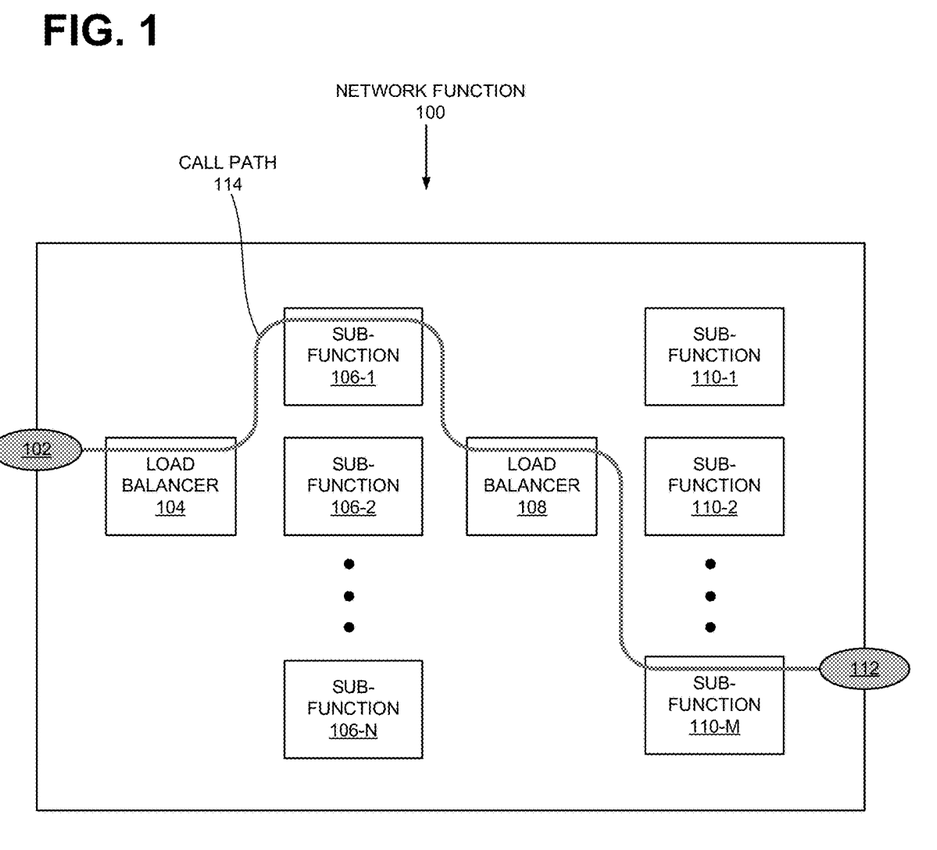
FIG. 1 illustrates exemplary functional components of an exemplary network function to which Canary release may be applied.

FIG. 1 illustrates exemplary functional components of an exemplary network function to which Canary release may be applied. In this implementation, network function 100 is a software component that runs over network hardware components (e.g., network computers, routers, bridges, switches, interfaces, software components, etc.). Network function 100 may include any network component that can be implemented as software. For example, network function 100 may include a 5th Generation (5G) network component, 4th Generation (4G) network component, or yet another type of network component.

As shown, network function 100 may include: an interface 102; a load balancer 104; sub-function or service instances 106-1 through 106-N (alternatively "service instances 106-1 through 106-N"); a load balancer 108; sub-function instances 110-1 through 110-M (alternatively "services 110-1 through 110-M"); and an interface 112.

Interface 102 provides an entry point for another component to request the services of network function 100. Upon receipt of a message or a service request via interface 102, load balancer 104 may forward the work associated with the message to one of services 106-1 through 106-N based on work load of each service 106. When the task is completed, service 106 that worked on the task forwards a message or a request (along with additional information/data) to load balancer 108, which then selects one of services 110, in a manner similar to load balancer 104. When service 110 completes the requested task, the selected service 110 forwards the result of its work via interface 112 to the network function that requested the service or to another network function.

In FIG. 1, although the call path 114 is illustrated as passing through service 106-1 and service 110-M, in other operating conditions, the path may pass through other services. Furthermore, in other implementations, network function 100 may include one, two, or other number of sets of services. Such services may have different dependencies, and therefore may lead to different call paths.

Figure 2:
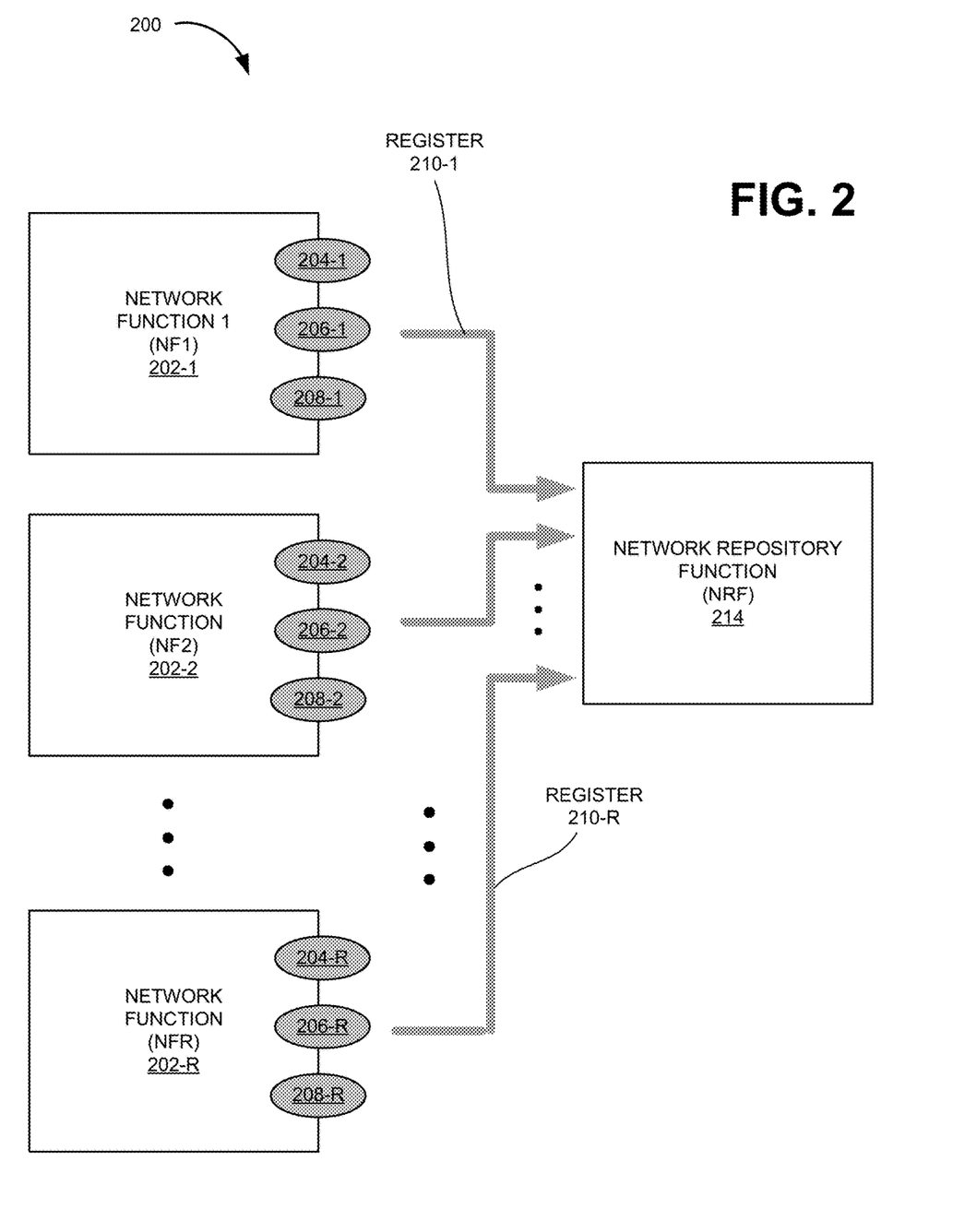
FIG. 2 illustrates the overview of an exemplary process associated with applying a Canary release to a network function.

FIG. 2 illustrates the overview of an exemplary process associated with applying Canary released to network functions. As shown, a network environment (or a network portion) 200 includes network functions 202-1 through 202-R (collectively network functions 202 and generically network function 202). As shown, each network function 202 includes services 204, 206, and 208. Although each network function 202 is illustrated as having only three services, the number of services may or may not be different for each network function 202. Furthermore, a particular service 204, 206, or 208 may be a different version of another service 204, 206, or 208, and thus can be a Canary release. In some situations, an entire network function may be a Canary release.

Network environment 200 also includes NRF 214, with which each network function 202 registers 210 its services. When a network function 202 registers its service 204, 206, or 208 with NRF 214, NRF 214 stores information pertaining to each services 204, 206, and 208 of network functions 202, Upon receipt of a discovery request from a network function, NRF 214 may provide information pertaining to a particular service to the requesting function.

In FIGS. 1 and 2, it may not be desirable to have a Canary release perform a transaction. For example, transactions related to Emergency calls should not pass through a Canary release, because a Canary release has a higher risk of failure than a version proven to be stable over a long test duration. In another example, transactions that are related to high priority users or services should not pass through Canary releases. Accordingly, it is important to control routing messages or transactions to or around Canary releases. As explained below, the systems and methods described herein achieve such control over routing of different messages by assigning priorities to network functions and services (e.g., an instance of a Canary release), a priority to a message or a transaction request, and routing the message to a network function or a service whose priority is equal to or higher than that of the message. As described below, different schemes may be employed to assign a priority (i.e., a number that signifies the importance of a message or a transaction request relative to other transactions) to a particular message or a transaction request.

Figure 3:
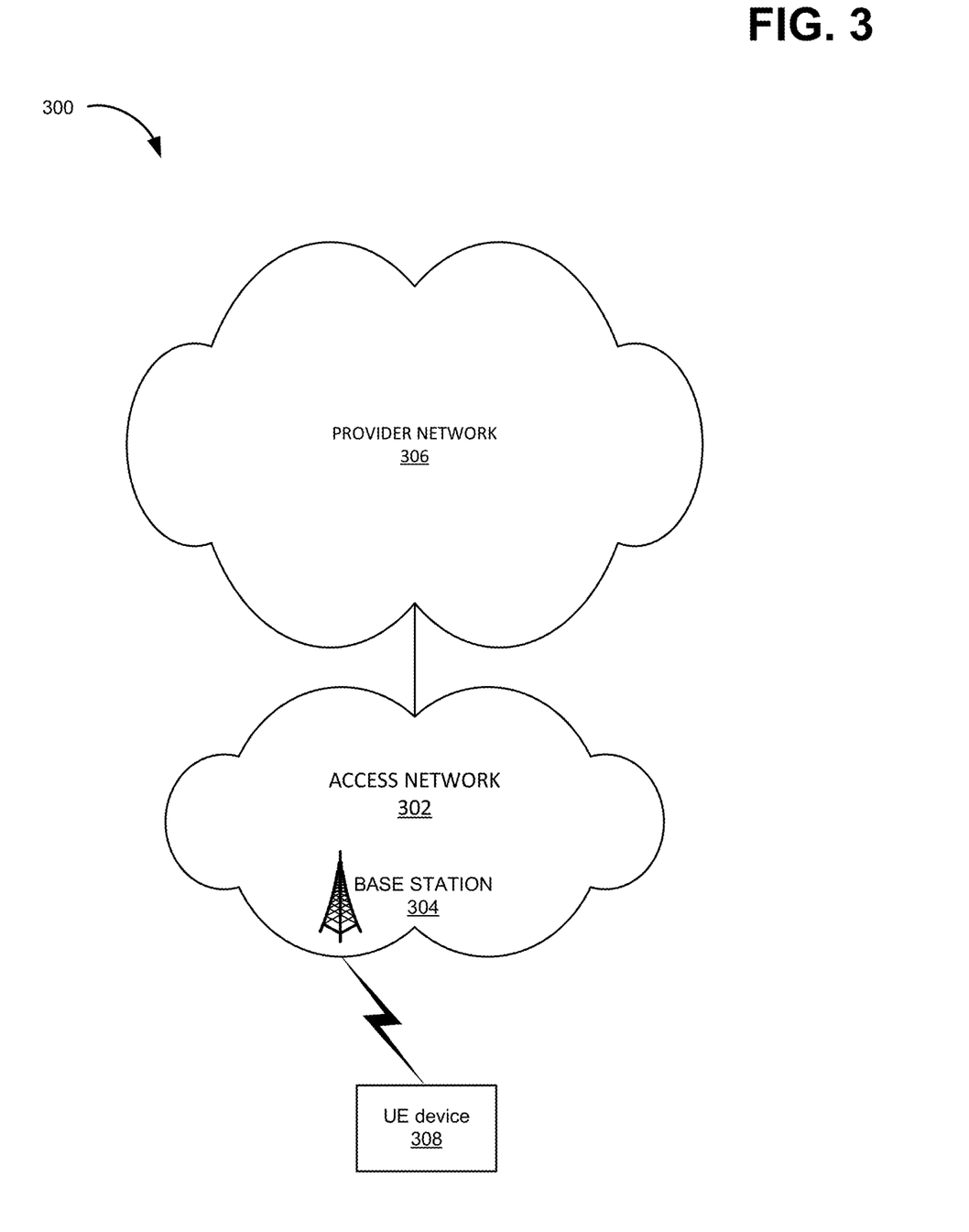
FIG. 3 illustrates an exemplary network environment in which the concepts associated with FIG. 1 and FIG. 2 may be implemented.

FIG. 3 illustrates an exemplary network environment 300 in which the above-described concepts may be implemented. As shown, network environment 300 may include an access network 302, a provider network 306, and a user equipment (UE) device 308. Depending on the implementation, network environment 300 may include additional networks and components than those illustrated in FIG. 3. For simplicity, FIG. 3 does not show all components that may be included in network environment 300 (e.g., routers, bridges, wireless access point, additional UE devices, etc.).

Access network 302 may allow UE device 308 to access provider network 306. To do so, access network 302 may establish and maintain, with participation from UE device 308, an over-the-air channel with UE device 308; and maintain backhaul channels with provider network 306. Access network 302 may relay information through these channels, from UE device 308 to provider network 306 and vice versa.

Access network 302 may include Long-term Evolution (LTE) radio network and/or a 5G radio network or other advanced radio network. These networks may include many wireless stations, one of which is illustrated in FIG. 3 as base station 304 for establishing and maintaining over-the-air channel with UE device 308.

Base station 304 may include a 4G, 5G, or another type of base station (e.g., eNB, gNB, etc.) that includes one or more radio frequency (RF) transceivers. Base station 304 may provide or support one or more of the following: carrier aggregation functions; advanced or massive multiple-input and multiple-output (MIMO) antenna functions (e.g., 8×8 antenna functions, 16×16 antenna functions, 256×256 antenna functions, etc.); cooperative MIMO (CO-MIMO) functions; relay stations; Heterogeneous Network (HetNets) of overlapping small cell-related functions; macrocell-related functions; Machine-Type Communications (MTC)-related functions, such as 1.4 MHz wide enhanced MTC (eMTC) channel-related functions (i.e.,Cat-M1), Low Power Wide Area (LPWA)-related functions such as Narrow Band (NB) Internet-of-Thing (IoT) (NB-IoT) technology-related functions, and/or other types of MTC technology-related functions; and other types of LTE-Advanced (LTE-A) and/or 5G-related functions. In some implementations, base station 304 may be part of an evolved UMTS Terrestrial Network (eUTRAN).

Provider network 306 may include a local area network (LAN), a wide area network (WAN), a metropolitan area network (MAN), an optical network, a cable television network, a satellite network, a wireless network (e.g., a CDMA network, a general packet radio service (GPRS) network, an LTE network (e.g., 4th Generation (4G) network), a 5G network, an ad hoc network, a telephone network (e.g., the Public Switched Telephone Network (PSTN), an intranet, or a combination of networks. Provider network 306 may allow the delivery of Internet Protocol (IP) services to UE device 308, and may interface with other external networks, such as a packet data network. Provider network 306 may include or be connected to one or more packet data networks.

UE device 308 may include a wireless computational, communication device. Examples of a UE device 308 include: a smart phone; a tablet device; a wearable computer device (e.g., a smart watch); a global positioning system (GPS) device; a laptop computer; a media playing device; a portable gaming system; an IoT device. In some implementations, UE device 308 may correspond to a wireless MTC device that communicates with other devices over a machine-to-machine (M2M) interface, such as LTE-M or Category M1 (CAT-M1) devices and Narrow Band (NB)-IoT devices.

To install a Canary release in provider network 306, when a network operator (e.g., an administrator or a developer) codes or updates a network function or a service, the operator may compile and/or store appropriate code. Next, the network function 202 or service associated with the code is assigned a value for a priority associated with each network function 202 or service. After assigning the value, the operator may instantiate and register the network function 202 at NRF 214. Thereafter, the newly registered network function 202 or service version may then begin to accept messages and/or transactions from other network components.

Figure 4:
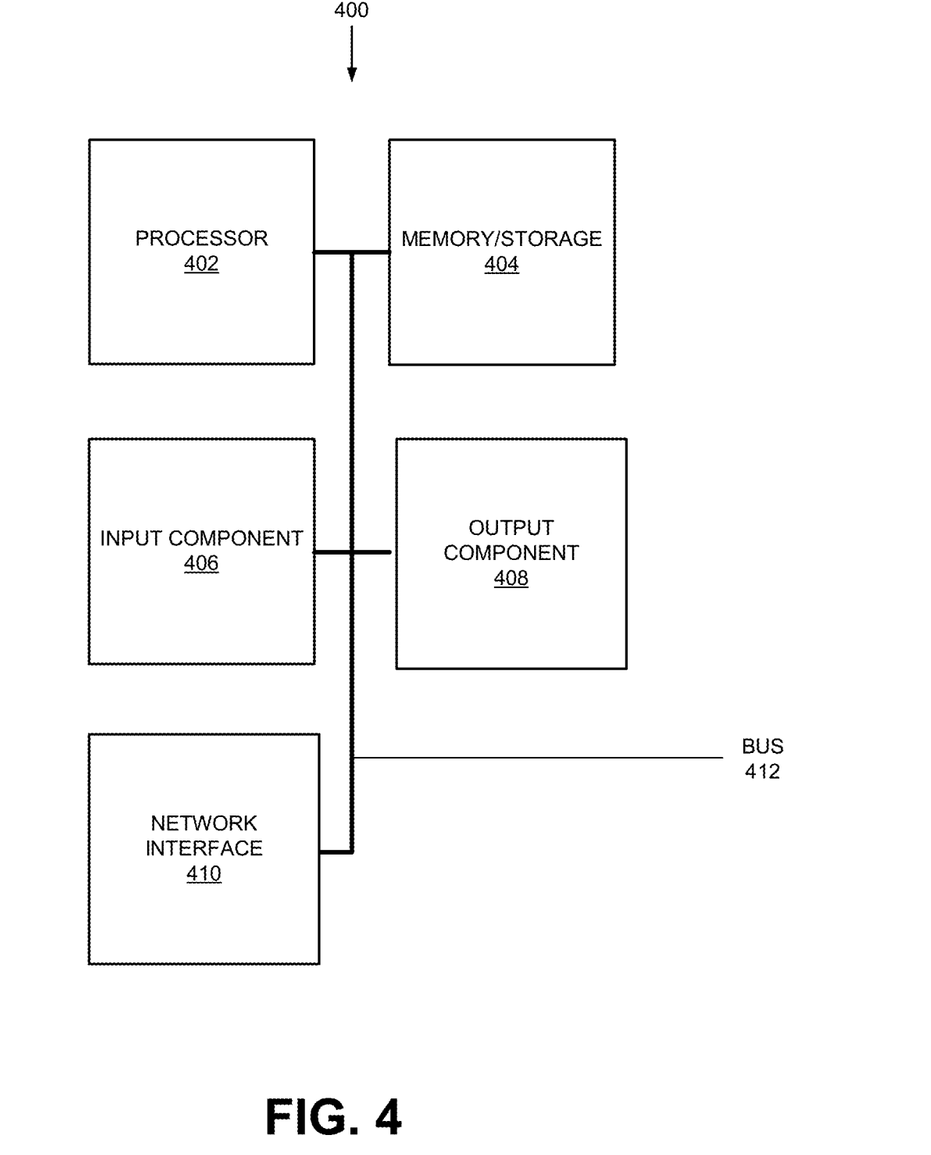
FIG. 4 depicts exemplary components of an exemplary network device of FIG. 3.

FIG. 4 depicts exemplary components of an exemplary network device 400. Network device 400 may correspond to or be included in any of the devices and/or components illustrated in FIG. 3 (e.g., access network 302, provider network 306, UE device 308, etc.). In some implementations, network devices 400 may be part of a hardware network layer on top of which other network layers and functions (e.g., network functions 100 and 202) may be implemented.

As shown, network device 400 may include a processor 402, memory/storage 404, input component 406, output component 408, network interface 410, and communication path 412. In different implementations, network device 400 may include additional, fewer, different, or different arrangement of components than the ones illustrated in FIG. 4. For example, network device 400 may include line cards, modems, etc.

Processor 402 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory/storage 404 may include static memory, such as read only memory (ROM), and/or dynamic memory, such as random access memory (RAM), or onboard cache, for storing data and machine-readable instructions (e.g., programs, scripts, etc.).

Memory/storage 404 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 304 may be external to and/or removable from network device 400. Memory/storage 404 may include, for example, a Universal Serial Bus (USB) memory stick, a dongle, a hard disk, off-line storage, a Blu-Ray® disk (BD), etc. Memory/storage 404 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 406 and output component 408 may provide input and output from/to a user to/from device 400. Input/output components 406 and 408 may include a display screen, a keyboard, a mouse, a speaker, a microphone, a camera, a DVD reader, USB lines, and/or other types of components for obtaining, from physical events or phenomena, to and/or from signals that pertain to device 400.

Network interface 410 may include a transceiver (e.g., a transmitter and a receiver) for network device 400 to communicate with other devices and/or systems. For example, via network interface 410, network device 400 may communicate over a network, such as the Internet, an intranet, a terrestrial wireless network (e.g., a WLAN, WI-FI®, WIMAX®, etc.), a satellite-based network, optical network, etc. Network interface 410 may include a modem, an Ethernet interface to a LAN, and/or an interface/connection for connecting device 400 to other devices (e.g., a BLUETOOTH® interface).

Communication path 412 may provide an interface through which components of device 300 can communicate with one another.

Network device 400 may perform the operations described herein in response to processor 402 executing software instructions stored in a non-transient computer-readable medium, such as memory/storage 404. The software instructions may be read into memory/storage 404 from another computer-readable medium or from another device via network interface 410. The software instructions stored in memory/storage 404, when executed by processor 402, may cause processor 402 to perform processes that are described herein.

For example, when network functions 202 and NRF 214 are implemented, the network device 400 may execute computer instructions that correspond to network functions 202 and NRF 214. In another example, when a network operator registers a network function 202 at NRF 214, when a network function 202 queries NRF 214, or when a message is routed to a Canary release, network devices 400 may execute computer instructions corresponding to the registration, the query, and the routing.

As discussed earlier, the systems and methods described herein achieve a control over routing of different transactions by assigning a priority to each network function and service version instances, a priority to each messages or transaction requests, and routing the messages or transaction requests to network function and/or service instances whose priority is equal to or higher than that of the transaction request. Different schemes may be employed to assign a priority (i.e., a number that signifies the importance of a message or transaction request relative to other messages or transaction requests) to a particular message or transaction request. As further described herein, the systems and methods for routing messages or transactions to Canary releases based on the priorities are implemented in the context of the Service-Based Architecture (SBA) for 5G networks.

Figure 5:
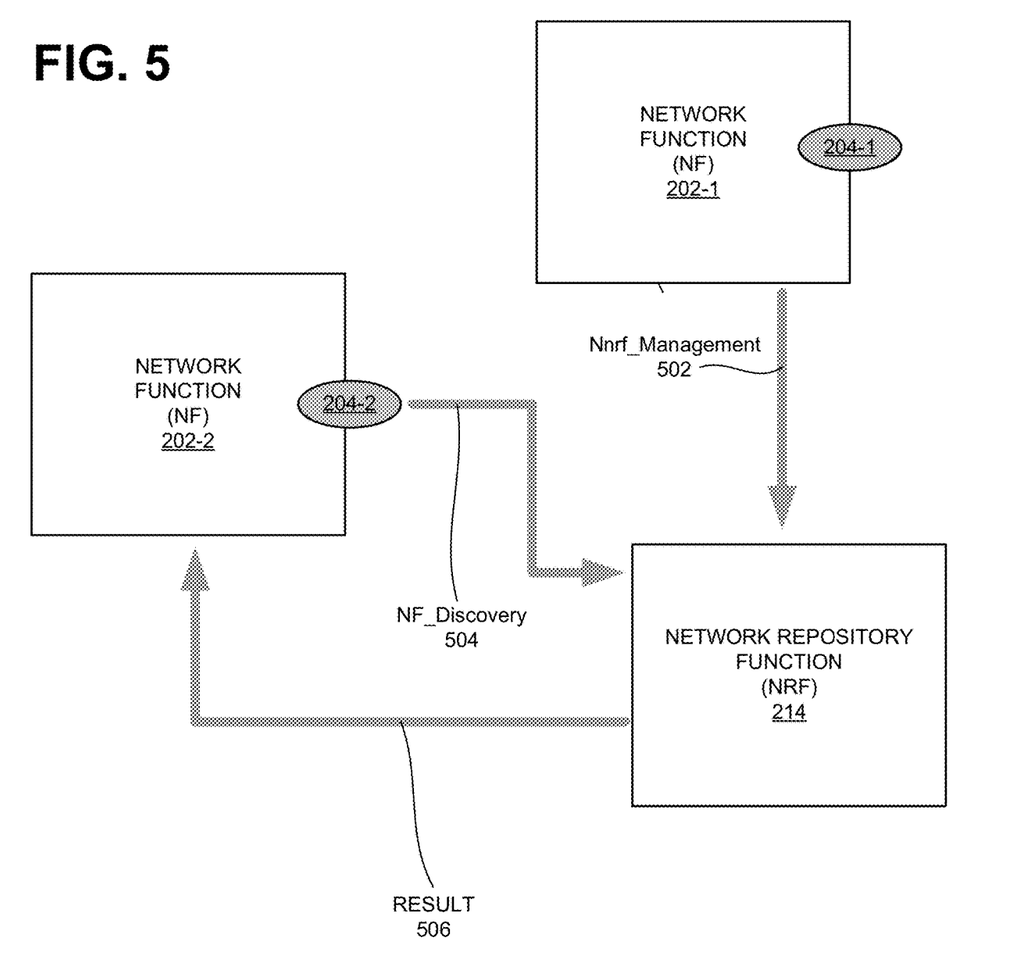
FIG. 5 illustrates exemplary components of a Service-Based Architecture (SBA)

FIG. 5 illustrates exemplary components of the Service-Based Architecture (SBA). More specifically, FIG. 5 illustrates exemplary management and discovery operations 502 and 504 as components of the SBA. As discussed below, these operations entail: exchanging information which includes network function priorities and service priorities; and storing these values at NRF 214. As explained with reference to FIG. 7, the stored priorities are retrieved and used to route messages or transaction requests to or around Canary releases.

As shown in FIG. 5, network function 202-1 performs a management operation 502 with NRF 214 (e.g., a registration operation) and a discovery operation 504 at NRF 214 (e.g., a search). In response to a discovery request, NRF 214 conducts a search in its local storage or database and provides a result 506 to network function 202-2. Depending on the implementation, network functions 202 and NRF 214 may perform additional processes, such as authorization.

According to some implementations, network functions 202 and NRF 214 perform the operations illustrated in FIG. 5 in accordance with a standard, such as a 5G standard or another type of standard. The standard may, for example, specify the formats of calls that network functions 202 and NRF 214 may invoke to perform management operation 502 and discovery operation 504 within a Public Land and Mobile Network (PLMN) or a different PLMN.

In one implementation, network functions 202 and NRF 214 may use an interface that is implemented in accordance with Representational State Transfer (REST or RESTful) Application Programming Interface (API). These REST APIs include Hypertext Transfer Protocol (HTTP or HTTPS) calls (e.g., PUT, POST, PATCH, GET, and/or DELETE) with Javascript Object Notation (JSON) documents in the bodies of the calls or responses. Through the REST APIs, network functions 202 and NRF 214 may invoke different sets of calls for management operation 502 and discovery operation 504. Although not shown, network functions 202 and NRF 214 may also make calls related to authorization.

Figure 6A:
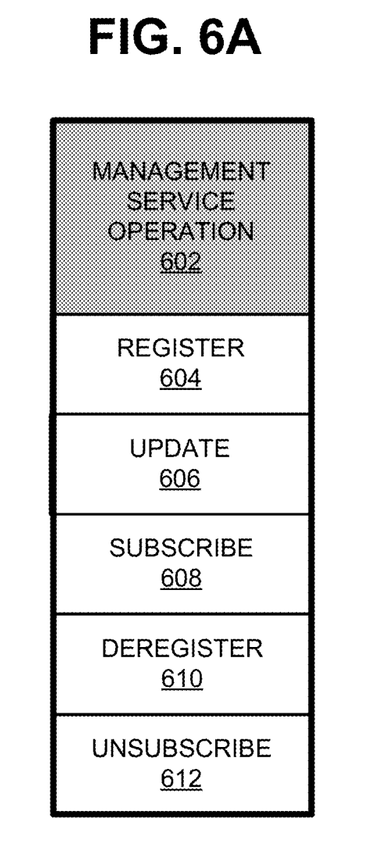
FIG. 6A illustrates an exemplary set of service calls that the network functions or the Network Repository Function (NRF) may make, to perform the management operations.

FIG. 6A illustrates an exemplary set of service calls that network function 202 or NRF 214 may make to perform management operation 502. As shown, management operation 502 may include: register 604, update 606, deregister 608, subscribe 610, and unsubscribe 612. These operations are performed through REST API calls with one or more arguments (i.e., data) having a specific JSON structure or format, as described below with reference to FIGS. 6B-6D. When invoked, these management operations 502 result in exchange of priority information that may be used for routing messages or transaction requests to or around Canary releases. Depending on the implementation, management operations 502 may include additional, fewer, or different operations than those illustrated in FIG. 6A (e.g., Authorization operation).

Register operation 604 may be invoked by network function 202. The call is accompanied by a description of the calling network function 202 (e.g., the calling network function 202 sends the description to NRF 213). When NRF 214 receives the registration request, NRF 214 may store the description of the calling network function 202 at a local storage (e.g., a persistent storage). The description (herein referred to as "NF profile" or "profile") may include information needed by a consumer network function (i.e., a network function 202 that is serviced by the particular network function 202). Components of a NF profile are described below with reference to FIG. 6C.

Update operation 606, when invoked by a network function 202 at NRF 214, causes NRF 214 to update the registered information associated with the network function 202. When calling update operation 606, network function 202 may provide NRF 214 with the replacement NF profile.

Subscribe operation 608 permits a network function 202 to subscribe to the notification service offered by NRF 214. When a network function 202 subscribes at NRF 214, the network function 202 may receive a notification when other different network functions 202 register, deregister, and/or update their NF profiles at NRF 214.

Deregister operation 610 and unsubscribe operation 612, when invoked by network function 202, cause NRF 214 to remove the NF profile from the storage at NRF 214 and to stop notifying the network function 202, respectively.

Although FIG. 6A shows only management operation 502, network functions 202 and NRF 214 may also support a discovery operation 504 or other types of operations (e.g., authorization). Discovery operation 504 is performed via the HTTP GET command, issued with HTTP query parameters. In response to receipt of a search request from network function 202, NRF 214 returns a list of Universal Resource Identifiers (URIs) that correspond to network functions 202 and/or NF services whose NF profiles match the query criteria.

Figure 6B:
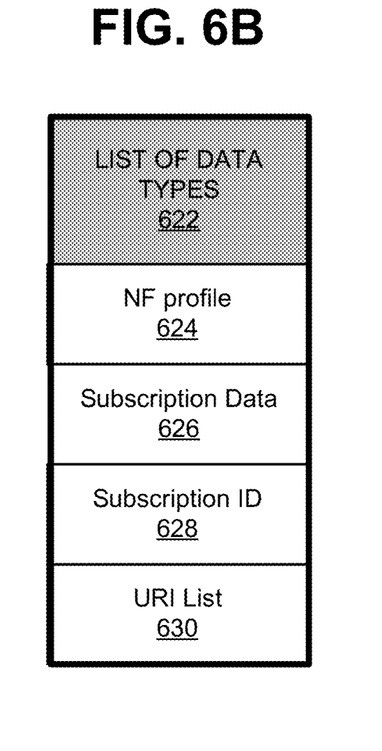
FIG. 6B illustrates an exemplary list of exemplary data types that may flow between the network functions and the NRF during a management operation.

FIG. 6B illustrates an exemplary list 622 of exemplary data types that may flow between network functions 202 and NRF 214 during management operation 502 and discovery operation 504. As shown, list 622 may include NF profile 624, Subscription Data 626, Subscription ID 628, and URI List 630. Depending on the implementation, each of the types 624-630 may be a compound datum that includes priority information related to network functions 202 and services. Although not shown, depending on the implementation, network functions 202 and NRF 214 may exchange additional, fewer, or different types of data than those illustrated in FIG. 6B.

NF profile 624 may include information that describes a particular network function 202. As indicated above, network function 202 may send NF profile 624 (or another type of data) during management operation 502 (e.g., registration). NF profile 624 is described below in greater detail with reference to FIG. 6C.

Subscription Data 626 may be sent by a network function 202 to NRF 214 when the network function 202 subscribes to the notification service offered by NRF 214. Subscription Data 626 may include information that NRF 214 may use to determine what and when network function 202 is to be notified by NRF 214. For example, Subscription Data 626 may indicate for how long the network function 202 is to receive notifications from NRF 214, what events the network function 202 is to be notified of (e.g., registration of another network function 202, registration, updates, deletion or removal, etc.), the name of the service to be notified about, the type of network function 202 to be notified about, etc.

Subscription ID 628 may include an identifier that uniquely identifies a particular subscription. When a network function 202 sends a request for a subscription to NRF 214, NRF 214 may generate and send a subscription ID 628 to the network function 202 for later use. The network function 202 may submit the subscription ID 628 to NRF 214, for example, when the network function 202 requests NRF 214 to unsubscribe to the notification service.

URI List 630 may include a list of URIs. Many information exchanges between network functions 202 and NRF 214 may include one or more URI Lists 630. For example, when network function 202 sends a discovery or search request to NRF 214 for a list of network functions 202 and services that match its search criteria, NRF 214 may return a URI list 630. Each item designated by the corresponding URI in the URI List 630 would satisfy the search criteria provided by the network function 202 requesting the search.

Figure 6C:
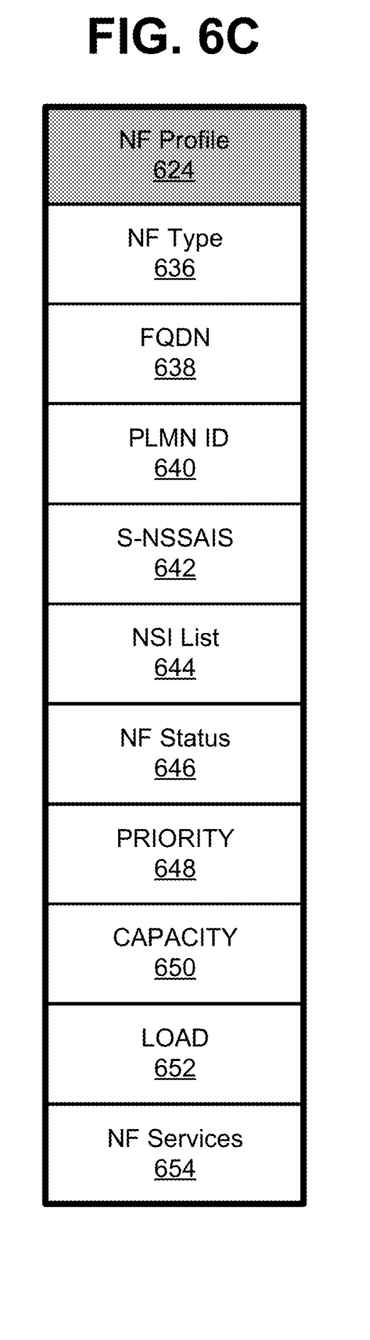
FIG. 6C illustrates an exemplary list of exemplary data components of an NF profile.

FIG. 6C illustrates an exemplary list of components 636-654 of NF Profile 624. As shown, NF profile 624 may include a NF type 636, Fully Qualified Domain Name (FQDN) 638, PLMN ID 640, S-NSSAIs 642, NSI List 644, NF Status, 646, priority 648, capacity 650, load 652, and one or more of NF service 654. Although NF profile 624 may include additional, fewer, or different data components, for simplicity, they are not illustrated in FIG. 6C.

NF type 636 may include a string that identifies the type of network function 202 which sent the NF profile 624 to NRF 214 and the type of network function 202 that NF profile 624 describes. For example, NF type 636 may include a string "SMF," which indicates that the network function 202 is a Session Management Function (SMF). Examples of other possible NF type 636 values include: "AF," "NRF," "UDM," "AMF," "AUSF," "NEF", and "PCF." These strings may correspond to, respectively, an Application Function (AF), a Network Repository Function (NRF), a User Data Management (UDM), an Access and Mobility Management Function (AMF), an Authentication Server Function (AUSF), a Network Exposure Function (NEF), and a Policy Control Function (PCF). Some of these and other network functions 202 are described below with reference to FIG. 9.

FQDN 638 may include a fully qualified domain name of network function 202 which NF profile 624 describes. PLMN ID 640 identifies the PLMN of the network function 202.

S-NSSAIs 642 is a list or an array of information. Each S-NSSAI includes: (A) a network slice/service type and (B) information for differentiating one network slice from another. The collection of S-NSSAIs 642 may also be referred to as Network Slice Selection Assistance Information (NSSAI). As used herein, the term "network slice" may refer to a logical network that provides specific network capabilities and network characteristics. The logical network, for example, may be a virtual network comprising network functions 202. Thus, a physical network may be "sliced" into multiple network slices.

NSI List 644 may include a list of Network Slice Instance (NSI) identities of the network function 202. NF status 646 indicates whether network function 202 is capable of being discovered by other network functions 202 or not capable of being discovered by other network functions 202.

Priority 648 may include a value that indicates the priority of network function 202 over other network functions 202 of the same type. In one implementation, priority 648 may include a numerical value (i.e., an integer) in the range of 0-65535, in which lower values indicate higher priorities. If values of priorities are present for the services that the network function 202 provides, those priority values may have precedence over priority 648.

Capacity 650 may provide capacity information for the network function 202 described by NF profile 624. In one implementation, capacity 650 may include an integer value (e.g., in the range of 0-65535) that denotes a weight relative to other network functions 202 of the same type. If values for capacities are also present for the services that the network function 202 provides, those capacity values may have precedence over capacity 650.

Load 652 may indicate the current load of network function 202 in terms of percentage. In one implementation, load 652 may be an integer value in the range 0-100.

NF services 654 may include a list or array of information. Each item in the list or the array may describe a service that network function 202 provides.

Figure 6D:
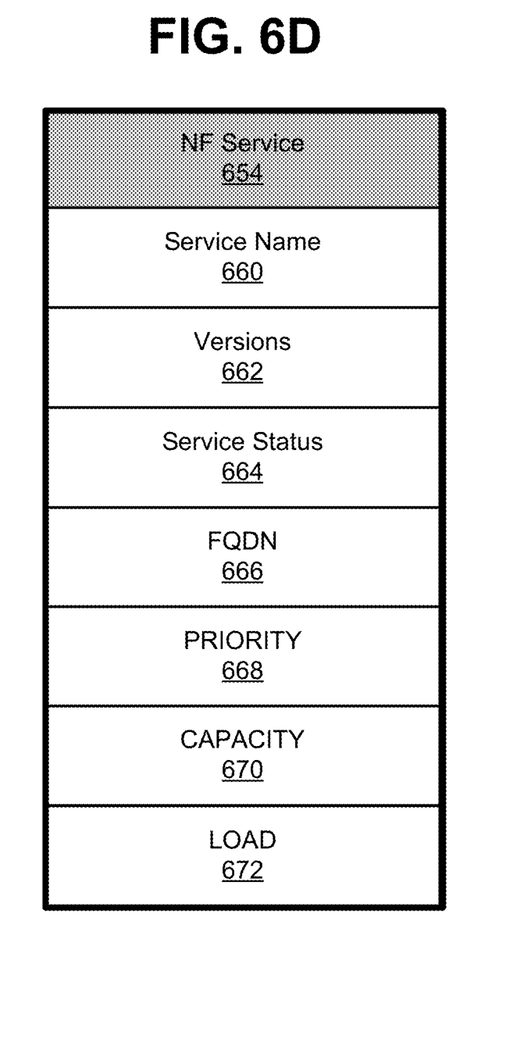
FIG. 6D illustrates an exemplary list of exemplary data components of an NF service.

FIG. 6D illustrates an exemplary list of data components of NF service 654. As shown, NF service 654 may include Service Name 660, Versions 662, Service Status 664, FQDN 666, priority 668, capacity 670, and load 672. Although NF service 654 may include additional, fewer, or different data components, for simplicity, they are not illustrated in FIG. 6D.

Service Name 660 may indicate the name of service that NF service 654 describes. For example, assume that a network function 202 is NRF 214, and that service Name 660 is a string "nnrf-nfm." The string identifies the Nnrf-_NFManagement Service, which is offered by NRF 214.

Versions 662 include a list or array of version data. Each version data provides information for a version supported by the NF Service 654. The version data includes the corresponding retirement date of the NF service 654.

Service status 664 indicates whether NF service 654 is capable of being discovered by other network functions 202 or not capable of being discovered by other network functions 202. FQDN 666 may include a fully qualified domain name of the service described by NF Service 654.

Priority 668, capacity 670, and load 672 are similar to priority 648, capacity 650, and load 652. In contrast to priority 648, capacity 650, and load 652, however, priority 668, capacity 670, and load 672 apply to the service described by NF Service 654.

With management operation 502 and discovery operation 504 in place as described above with reference to FIG. 5 and FIGS. 6A-6D, messages or transaction requests may be routed to or around Canary releases at least partly based on the values of priority 648 and priority 668. Other significant parameters that may be used in conjunction with priorities 648 and 668 include: NF type 636, S-NSSAIS 642, capacity 650, load 652, Service Name 660, versions 662, capacity 670, and load 672. Depending on the implementation, routing transaction requests may entail using additional or fewer parameters.

Figure 7:
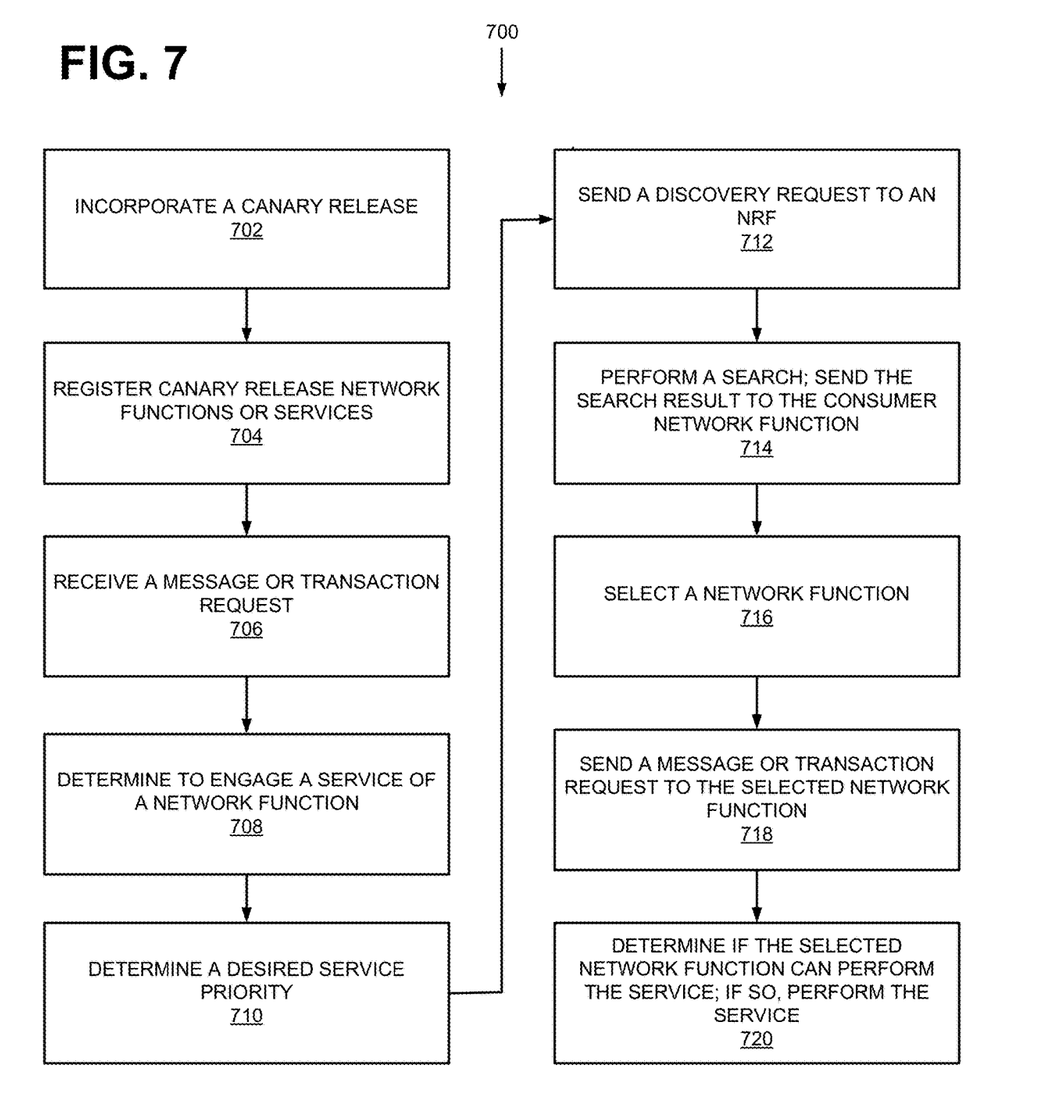
FIG. 7 is a flow diagram of an exemplary process associated with routing messages in the presence of a Canary release.
Figure 8:
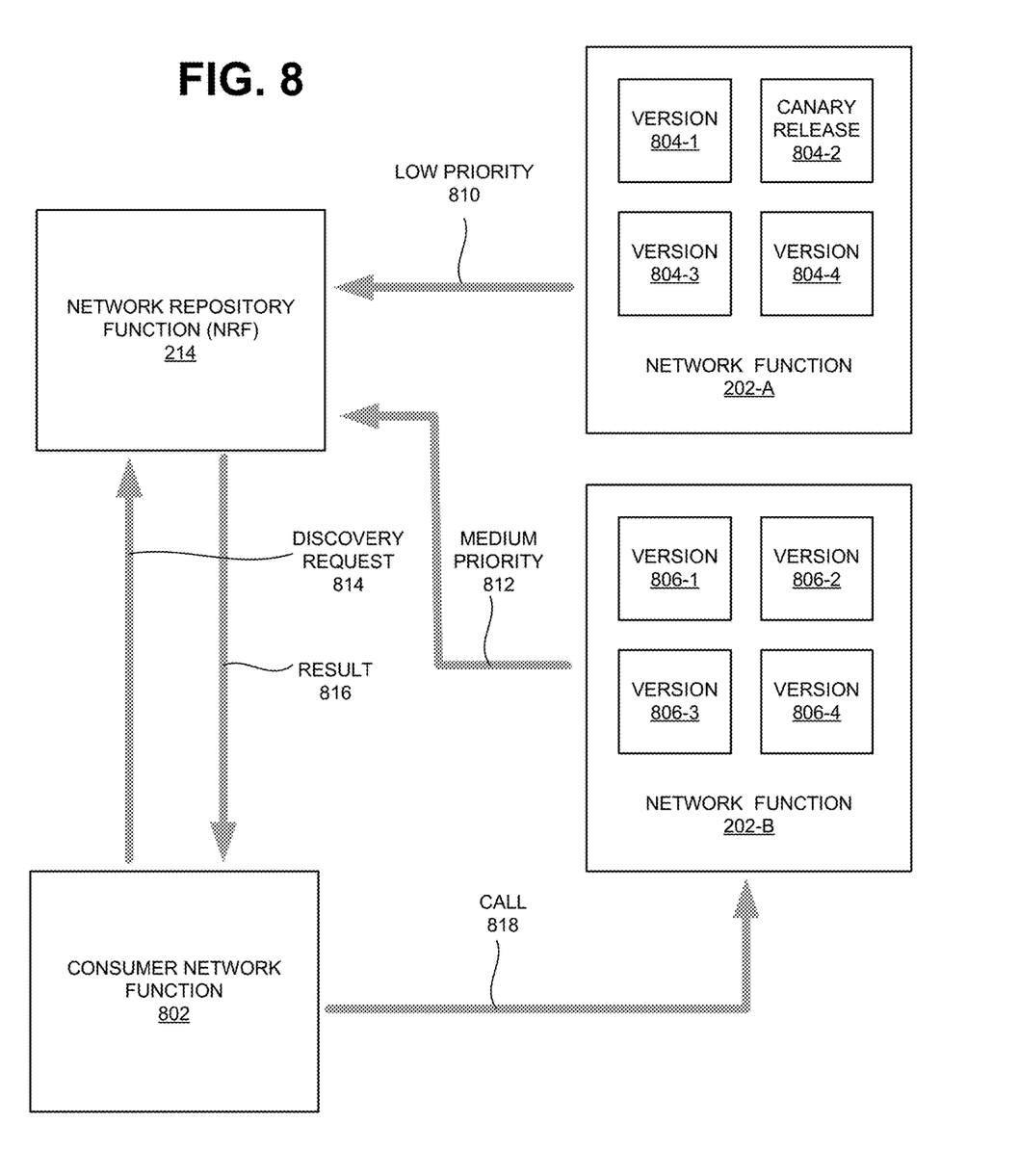
FIG. 8 illustrates a process being performed within a provider network.

FIG. 7 is a flow diagram of an exemplary process 700 associated with routing transaction requests to or about Canary releases based on priorities 648 and 668. Process 700 may be performed by network functions 202 and/or NRF 214. FIG. 8 illustrates process 700 being performed within a network portion 800.

As illustrated in FIG. 7, process 700 may include incorporating a Canary release of a network function 202 or service (block 702). For example, in FIG. 8, network function 202-A includes service versions 804-1 through 804-4, having incorporated a Canary release as version 804-2. Network function 202-B includes service versions 806-1 through 806-4.

Process 700 also includes a network function registering with an NRF (block 704). In FIG. 8, network function 202-A registers with NRF 214, indicating a low priority in its NF profile 624 (810). When registering, the network functions or the services with Canary releases are assigned lower priorities. Also in FIG. 8, network function 202-B registers with NRF 214 (812). In contrast to the low priority registration 810, registration 812 is of medium priority. Assume for the purposes of this example, that network functions 202-A and 202-B are the same NF type 636.

In a different implementation, rather than registering, the network function may perform an update (e.g., when it installs a Canary release) at the NR, which results in lowering of the network function priority or service priority.

Process 700 further includes a network function 202 (e.g., a network function 202 that is to employ the services of another network function 202) receiving a message or a transaction request, for example, from another network function 202 (block 706). In response, the network function 202, which receives the message (also referred to as "consumer network function" or simply "consumer"), determines that it is to engage a particular service of a particular type of network function 202 (block 708).

To engage the service, the consumer network function determines the desired priority of the service that it needs (block 710). In one embodiment, the determination may be based on one of more of the following: a priority of the message it received (e.g., a 3GPP-SBI-Message priority); an S-NSSAI that identifies the network slice associated with the consumer network function; the type of service; and a priority associated with a user subscription and UE device 308 which caused the generation of the message received at the consumer network function.

Depending on the implementation, the consumer network function may perform specific calculations to determine the desired or target priority of the service to be engaged. For example, in one implementation, the consumer network function may derive a significance value for each of the following parameters: a priority of the received message; an S-NSSAI that identifies the network slice associated with consumer 702; the type of the service; and the priority associated with the user subscription and UE device 308 which caused the eventual generation of the received message. The consumer network function may then apply, to each of the above significance values, a corresponding weight and sum the weighted significance values. Next, the consumer network function may divide the weighted sum by a weighted sum of the maximum possible significance values of the parameters, to obtain a raw priority. The consumer network function may normalize the raw priority to derive a desired or target priority for the service to be engaged. In other implementations, the consumer network function may apply different procedures to obtain the desired priority.

Process 700 may include sending a discovery request to an NRF (block 712). In FIG. 8, a consumer network function 802 (also referred to as "consumer network function 802") sends a discovery request 814 to NRF 214. In one implementation, the request may include a GET HTTP/HTTPS message, specifying one of more of the following query terms: an NF type, an S-NSSAIS; and a service name. Depending on the implementation, discovery request 814 may include different or additional query terms (e.g., the desired priority as the NF priority).

When an NRF receives the discovery request 814 from the consumer network function 802, the NRF performs a search, in a database or other storage device, for a list of NF profiles that match the query terms (block 714). For each NF profile that matches the query terms, the NRF obtains an URI associated with the network function corresponding to the matching NF profile. The NRF aggregates the URIs into a URI list, and sends the URI list as part of search result 816 to the consumer network function (block 714). FIG. 8 shows NRF 214 sending a result 816 in response to the discovery request 814.

Process 700 may further include selecting, among the network functions identified by the list of URIs received from the NRF, a network function based on the desired priority and the priorities associated with the network functions identified by the list of URIs (block 716). For example, in FIG. 8, assume that the URI list of result 816 identifies network function 202-A and 202-B; and that consumer network function 802 has determined the desired priority having a medium value. When consumer network function 802 receives the URI list, consumer network function 802 selects a network function between network functions 202-A and 202-B listed in result 816. Because network function 202-B has registered at NRF 214 with a medium priority value and consumer network function 802's desired priority is also a medium value, consumer network function 802 selects network function 202-B. Accordingly, consumer network function 802 avoids a network function that has a Canary release (e.g., network function 202-A).

In some implementations, when consumer network function 802 sends discovery request 814, consumer network function 802 may also specify the desired priority as one of the search terms. In such a case, result 816 may list the URIs of only those network functions whose NF priorities match the desired priority. If the URI list still includes multiple URIs, consumer network function 802 may select the network function based on other parameters, such as current load, capacity, etc.

Process 700 may include sending a message (e.g., a transaction request) to the selected network function (block 718). For example, FIG. 8 shows consumer network function 802 invoking a call 818 to network function 202-B. In one implementation, the transaction request may include a message priority, such as 3GPP SBI (Service-Based Interface) message priority, and S-NSSAI. Consumer network function 802 may set the 3GPP SBI message priority in call 818 based on the desired priority (which was determined in the manner described above).

When network function 202-B receives the call 818, network function 202-B may determine whether any of its service is able to perform the requested transaction based on the message priority (e.g., 3GPP-SBI-Message priority) (block 720). If so, network function 202-B may render the requested service (block 720). In determining whether it can render the requested service, network function 202-B may compare the 3GPP-SBI-Message priority to the priorities of the services.

In a different implementation, assume that network function 202-B includes a Canary release service (e.g., version 806-4 in FIG. 8). As described above, when network function 202-B receives the call 816, network function 202-B may determine whether any of its services is able to perform the requested transaction based on the message priority (e.g., 3GPP-SBI-Message priority) (block 720). Assume that network service version 806-4 is a Canary release and is associated with a priority lower than that of the message. If so, network function 202-B may avoid rendering the requested service using version 806-4. Rather, network function 202-B may render the service using another version (block 720) whose priority is higher or equal to that of the message.

Depending on the implementation, different portions of process 700 may be implemented as software in network functions 202. For example, in some implementations, a network functions 202 may include instructions for determining a desired priority (as described above for block 710) and for selecting another network function 202 whose service is to be engaged based on the desired priority. In addition, a network function 202 may also include instructions for determining whether a requested service can be rendered by one of its hosted services based on 3GPP-SBI-Message priority included in the service request and rendering the service if the priority of the hosted service is equal or higher than that of the request (as described above for block 720).

These instructions, in conjunction with management operation 502 and discovery operation 504, result in routing messages and/or transaction requests to those network functions 202 or services whose priorities are equal or higher than the desired priority. Since Canary releases are assigned lower priorities, messages or transaction requests with higher priorities are routed away from Canary releases, whereas lower priority messages and transaction requests may be processed by the Canary releases. For example, in one implementation, if result 816 identifies one network function 202 with a Canary release service and another without, consumer network function 802 may select the network function 202 with the Canary release, if the load at the Canary release service is lower than at other services.

Figure 9:
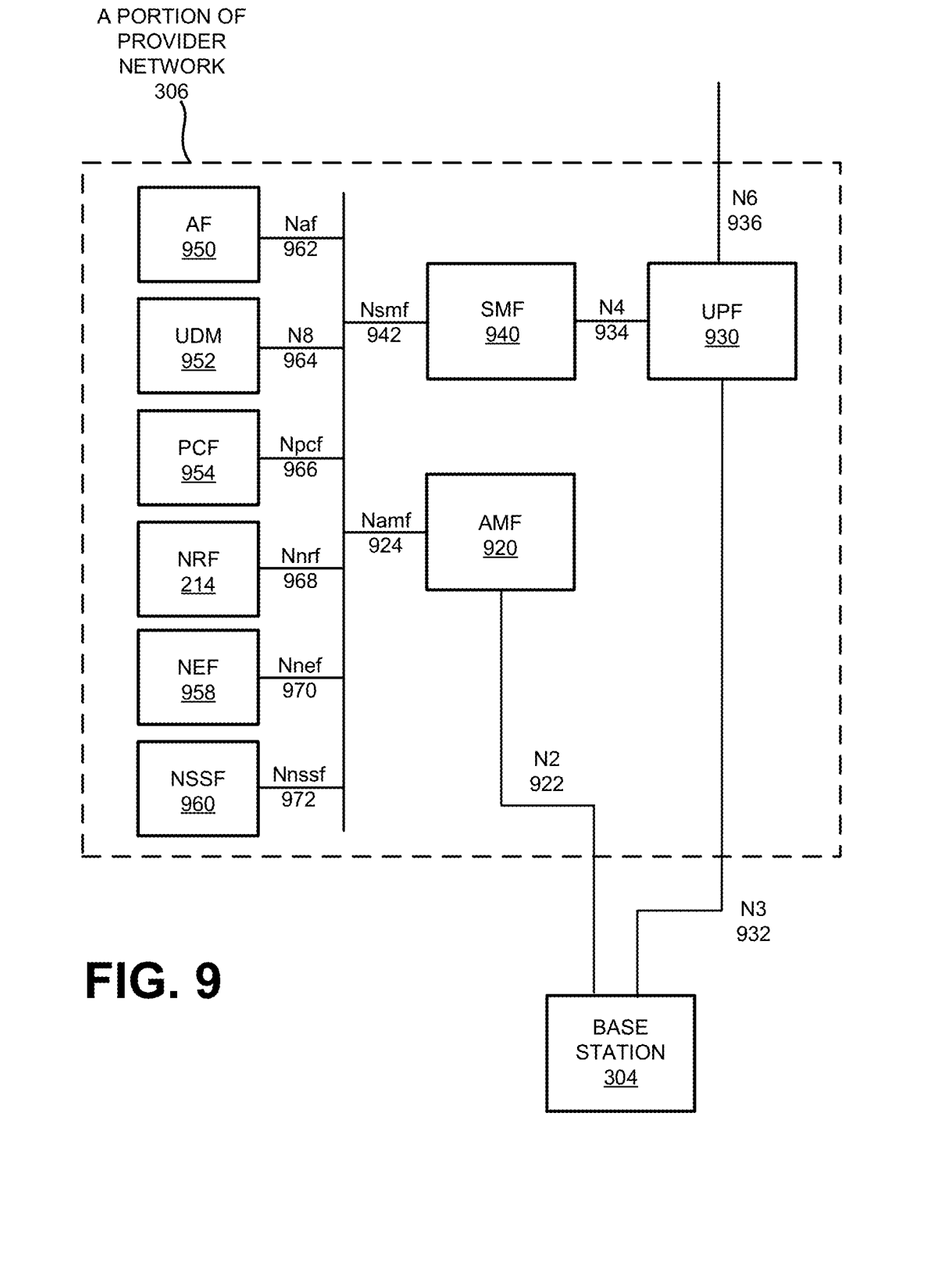
FIG. 9 illustrates exemplary network functions of a provider network.

FIG. 9 illustrates exemplary network functions 202 in a portion of provider network 306 of FIG. 3. As shown, the network functions 202 include: an Access and Mobility Function (AMF) 920, a User Plane Function (UPF) 930, a Session Management Function (SMF) 940, an Application Function (AF) 950, a Unified Data Management (UDM) 952, a Policy Control Function (PCF) 954, a Network Repository Function (NRF) 956, a Network Exposure Function (NEF) 958, a Network Slice Selection Function (NSSF) 960, and an enhanced MBMS gateway (eMBMS GW) 970. N2 922, Namf 924, N3 932, N4 934, N6 936. Nsmf 942. Naf 962, N8 964, Npcf 966, Nnrf 968, Nnef 970 and Nnsf 972 are 3GPP-Serviced Based Interfaces (SBIs).

AMF 920 may perform registration management, connection management, reachability management, mobility management, lawful intercepts, Short Message Service (SMS)

transport between UE device 110 and an SMS function (not shown in FIG. 3), session management message transport between UE device 308 and SMF 940, access authentication and authorization, location services management, support of non-3GPP access networks, and/or other types of management processes. AMF 920 may page UE device 308 based on mobility category information associated with UE device 308 obtained from UDM 952. In some implementations, AMF 920 may implement some or all of the functionality of managing RAN slices in base station 304. AMF 920 may be accessible by other function nodes via Namf interface 924.

UPF 930 may: maintain an anchor point for intra/inter-RAT mobility (e.g., mobility across different radio access technologies (RATs); maintain an external Packet Data Unit (PDU) point of interconnect to a data network (e.g., an IP network, etc.); perform packet routing and forwarding; perform the user plane part of policy rule enforcement; perform packet inspection; perform lawful intercept; perform traffic usage reporting; perform Quality-of-Service (QoS) handling in the user plane; perform uplink traffic verification; perform transport level packet marking; perform downlink packet buffering; send and forwarding an "end marker" to a Radio Access Network (RAN) node (e.g., base station 304); and/or perform other types of user plane processes. UPF 930 may communicate with SMF 940 using an N4 interface 934 and connect to IP network using an N6 interface 936.

SMF 940 may: perform session establishment, modification and/or release; perform IP address allocation and management; perform Dynamic Host Configuration Protocol (DHCP) functions; perform selection and control of UPF 930; configure traffic steering at UPF 930 to guide traffic to the correct destination; terminate interfaces toward PCF 954; perform lawful intercepts; charge data collection; support charging interfaces; control and coordinate charging data collection; terminate session management parts of NAS messages; perform downlink data notification; manage roaming functionality; and/or perform other types of control plane processes for managing user plane data. SMF 940 may be accessible via Nsmf interface 942.

AF 950 may provide services associated with a particular application, such as, for example, application on traffic routing, accessing NEF 958, interacting with a policy framework for policy control, and/or other types of applications. AF 950 may be accessible via Naf interface 962.

UDM 952 may: maintain subscription information for UE devices 308; manage subscriptions; generate authentication credentials; handle user identification; perform access authorization based on subscription data; perform network function registration management; maintain service and/or session continuity by maintaining assignment of SMF 940 for ongoing sessions; support SMS delivery, support lawful intercept functionality; and/or perform other processes associated with managing user data. For example, UDM 952 may store subscription profiles that include authentication, access, and/or authorization information. Each subscription profile may include: information identifying UE device 308; authentication and/or authorization information for UE device 308; information identifying services enabled and/or authorized for UE device 308; device group membership information for UE device 308; and/or other types of information associated with UE device 308. Furthermore, the subscription profile may include mobility category information associated with UE device 308. UDM 952 may be accessible via N8 interface 964.

PCF 954 may support policies to control network behavior, provide policy rules to control plane functions (e.g., to SMF 940), access subscription information relevant to policy decisions, perform policy decisions, and/or perform other types of processes associated with policy enforcement. PCF 954 may be accessible via Npcf interface 966.

NRF 214 has been discussed above. NRF 214 may be accessible via Nnrf interface 968.

NEF 958 may expose capabilities and events to other NFs, including third party NFs, AFs, edge computing NFs, and/or other types of NFs. Furthermore, NEF 958 may secure provisioning of information from external applications to network 306, translate information between provider network 306 and devices/networks external to access network 306, support a Packet Flow Description (PFD) function, and/or perform other types of network exposure functions. NEF 958 may be accessible via Nnef interface 970.

NSSF 960 may select a set of network slice instances to serve a particular UE device 308, determine network slice selection assistance information (NSSAI), determine a particular AMF 920 to serve a particular UE device 308, and/or perform other types of processes associated with network slice selection or management. NSSF 960 may be accessible via Nnssf interface 972.

Although FIG. 9 depicts a portion of provider network 306 as having a single AMF 920, UPF 930, SMF 940, AF 950, UDM 952, PCF 954, NRF 956, NEF 958, and/or NSSF 960 for simplicity, in practice, provider network 306 may include multiple AMFs 920, UPFs 930, SMFs 940, AFs 950, UDMs 952, PCFs 954, NRFs 956, NEFs 958, and/or NSSFs 360. Furthermore, provider network 306 may include fewer components, different components, differently arranged components, or additional components than depicted in FIG. 9. For example, 6network 304 may include additional function nodes not shown in FIG. 9, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions, other types of devices, components, etc.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIG. 7, the order of the blocks and signaling may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising one or more devices that include a memory to store instructions and one or more processors to execute the instructions to create a plurality of objects in the memory, wherein the objects include:
   an updated network function that includes a recent update, wherein the updated network function is configured to register at a Network Repository Function (NRF) using a Network Function profile (NF profile), wherein the NF profile indicates a Network Function type (NF type) and a first priority associated with the update; and
   a consumer network function configured to:
      receive a message from a network component;
      determine to engage a service of a network function of the NF type based on the message;
      determine a desired priority for the service;
      send a discovery request to the NRF in response to the message;
      receive a search result from the NRF in response to the discovery request, wherein the search result has a list of candidate network functions of the NF type, and wherein the candidate network functions include the updated network function;
      select one of the candidate network functions to perform the service; and
      send a request to perform the service to the selected candidate network function.

2. The system of claim 1, wherein the first priority is lower than priorities of other network functions, of the same NF type, that are registered at the NRF and do not include another recent update.

3. The system of claim 1, wherein when the consumer network function determines the desired priority for the service, the consumer network function determines the desired priority based on a second priority associated with the message.

4. The system of claim 3, wherein the second priority of the message includes a Service-Based Interface (SBI) priority.

5. The system of claim 1, wherein when the consumer network function selects one of the candidate network functions to perform the service, the consumer network function is configured to:

compare the desired priority to priorities of the candidate network functions; and
select the one of the candidate network functions when a priority of the one of the candidate network functions is equal to or lower than the desired priority.

6. The system of claim 1, wherein the selected candidate network function is the updated network function and wherein the selected candidate network function is further configured to:
   determine a third priority of the request; and
   perform the requested service if the third priority is equal to or lower than a priority of the service hosted by the selected candidate network function.

7. The system of claim 1, wherein when the consumer network function determines the desired priority, the consumer network function determines the desired priority based on one or more of:
   a priority of the message;
   an S-Network Slice Selection Assistance Information (S-NSSAI); and
   a type of the service.

8. The system of claim 1, wherein the NF type specifies one of:
   Application Function (AF);
   Access and Mobility Management Function (AMF);
   Authentication Server Function (AUSF);
   Network Exposure Function (NEF); and
   Policy Control Function (PCF).

9. The system of claim 1, wherein the list of candidate network functions includes a list of Uniform Resource Identifiers (URIs).

10. The system of claim 1, wherein the discovery request includes search terms, and wherein the search terms indicate the desired priority.

11. A method performed by one or more processors in one or more devices that include a memory to store instructions and the one or more processors to execute the instructions to create an updated network function in the memory, comprising:
   registering, by the updated network function that includes a recent update, at a Network Repository function (NRF) using a Network Function profile (NF profile), wherein the NF profile indicates a Network Function type (NF type) and a first priority associated with the update;
   receiving, by a consumer network function, a message from a network component;
   determining, by the consumer network function, to engage a service of a network function of the NF type based on the message;
   determining, by the consumer network function, a desired priority for the service;
   sending, by the consumer network function, a discovery request to the NRF in response to the message;
   receiving, by the consumer network function, a search result from the NRF in response to the discovery request, wherein the search result has a list of candidate network functions of the NF type, and wherein the candidate network functions include the updated network function;
   selecting, by the consumer network function, one of the candidate network functions to perform the service; and
   sending, by the consumer network function, a request to perform the service, to the selected candidate network function.

12. The method of claim 11, wherein the first priority is lower than priorities of other network functions, of the same NF type, that are registered at the NRF and do not include another recent update.

13. The method of claim 11, wherein determining, by the consumer network function, the desired priority for the service includes:
   determining, by the consumer network function, the desired priority based on a second priority associated with the message.

14. The method of claim 13, wherein the second priority of the message includes Service-Based Interface (SBI) priority.

15. The method of claim 11, wherein selecting, by the consumer network function, one of the candidate network functions to perform the service includes:
   comparing, by the consumer network function, the desired priority to priorities of the candidate network functions; and
   selecting, by the consumer network function, the one of the candidate network functions when a priority of the one of the candidate network functions is equal to or lower than the desired priority.

16. The method of claim 11, wherein the selected candidate network function is the updated network function and wherein the method further comprises:
   determining, by the consumer network function, a third priority of the request; and
   performing, by the consumer network function, the requested service if the third priority is equal to or lower than a priority of the service hosted by the selected candidate network function.

17. The method of claim 11, wherein determining the desired priority includes determining the desired priority based on one or more of:
   a priority of the message;
   an S-Network Slice Selection Assistance Information (S-NSSAI); and
   a type of the service.

18. A non-transitory computer-readable medium comprising computer-executable instructions, wherein the computer-executable instructions, when executed by one or more processors included in network devices, cause the one or more processors to:
   create an updated network function in a memory included in the network devices;
   register the updated network function, which includes a recent update, at a Network Repository Function (NRF) using a Network Function profile (NF profile), wherein the NF profile indicates a Network Function type (NF type) and a first priority associated with the update;
   receive, at a consumer network function, a message, from a network component;
   determine to have the consumer network function engage a service of a network function of the NF type based on the message;
   determine, at the consumer network function, a desired priority for the service;
   send, from the consumer network function, a discovery request to the NRF in response to the message;
   receive, at the consumer network function, a search result from the NRF in response to the discovery request, wherein the search result has a list of candidate network functions of the NF type, and wherein the candidate network functions include the updated network function;
   select, at the consumer network function, one of the candidate network functions to perform the service; and
   send, from the consumer network function, a request to perform the service to the selected candidate network function.

19. The non-transitory computer-readable medium of claim 18, wherein the first priority is lower than priorities of other network functions, of the same NF type that are registered at the NRF and do not include another recent update.

20. The non-transitory computer-readable medium of claim 18, wherein when the one or more processors determine, at the consumer network function, the desired priority for the service, the one or more processors determine, at the consumer network function, the desired priority based on a second priority associated with the message.

* * * * *